US012424077B2

United States Patent
Lipchin et al.

(10) Patent No.: US 12,424,077 B2
(45) Date of Patent: Sep. 23, 2025

(54) STAMPEDE DETECTION

(71) Applicant: MOTOROLA SOLUTIONS, INC., Chicago, IL (US)

(72) Inventors: Aleksey Lipchin, Newton, MA (US); Maksim Bolonkin, Waltham, MA (US); Keshav T. Seshadri, Medford, MA (US); Sergey Veselkov, Ashland, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 310 days.

(21) Appl. No.: 18/363,579

(22) Filed: Aug. 1, 2023

(65) Prior Publication Data

US 2025/0046175 A1 Feb. 6, 2025

(51) Int. Cl.
| | |
|---|---|
| *G06K 9/00* | (2022.01) |
| *G06T 7/20* | (2017.01) |
| *G06V 10/25* | (2022.01) |
| *G06V 20/52* | (2022.01) |
| *G08B 21/22* | (2006.01) |

(52) U.S. Cl.
CPC ............ *G08B 21/22* (2013.01); *G06T 7/20* (2013.01); *G06V 10/25* (2022.01); *G06V 20/53* (2022.01); *G06T 2210/12* (2013.01)

(58) Field of Classification Search
CPC ........ G08B 21/22; G06V 10/25; G06V 20/53; G06T 7/20; G06T 2210/12
See application file for complete search history.

(56) References Cited

U.S. PATENT DOCUMENTS

| | | | |
|---|---|---|---|
| 2022/0138475 A1* | 5/2022 | Chowdhury | G06V 10/751 382/103 |
| 2023/0117025 A1* | 4/2023 | Pradeep | H04N 7/188 348/143 |
| 2023/0186626 A1* | 6/2023 | Latapie | G06V 10/70 382/103 |

OTHER PUBLICATIONS

Altamimi et al., "Panic Detection in Crowded Scenes," Engineering, Technology & Applied Science Research, 2020, vol. 10, No. 2, pp. 5412-5418.

(Continued)

*Primary Examiner* — Avinash Yentrapati
(74) *Attorney, Agent, or Firm* — Michael Best & Friedrich LLP

(57) ABSTRACT

Examples provide an imaging system including an electronic processor configured to obtain video data of a scene including a region of interest including a plurality of frames, determine a total number of detected humans in the region of interest of a current frame of the plurality of frames, determine a number of running humans in the region of interest of the current frame, and determine a probability associated with the number of running humans in the region of interest of the current frame and the total number of detected humans in the region of interest of the current frame based on accumulated statistics for the region of interest. In response to determining that the probability is less than a threshold probability, the electronic processor generates an alert indicating a stampede is detected in the region of interest.

20 Claims, 7 Drawing Sheets

(56) References Cited

OTHER PUBLICATIONS

Devassy et al., "Stampede Detection and Pilgrim Tracking," International Journal for Research Trends and Innovation, 2017, vol. 2, Issue 3, pp. 77-82.

Shehab, "Panic Behavior Detection using Unsupervised Machine Learning Techniques: A Comparative Study," IEEE Asia-Pacific Conference on Computer Science and Data Engineering, 2021, 6 pages.

* cited by examiner

STAMPEDE DETECTION

BACKGROUND

Automated security and monitoring systems may rely on imaging devices, such as video cameras, with computer vision capabilities for detecting panic behavior, such as, for example, crowd stampedes.

Figure 1:
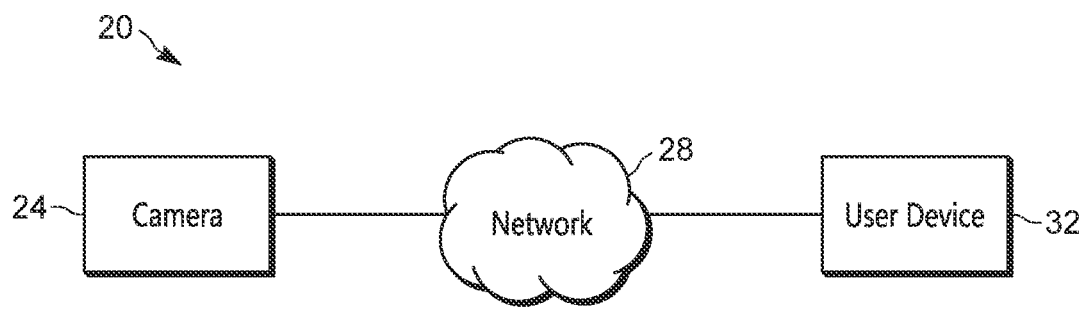
FIG. 1 illustrates a video security system, according to some aspects.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments, examples, aspects, and features.

The apparatus and method components have been represented where appropriate by conventional symbols in the drawings, showing only those specific details that are pertinent to understanding the embodiments, examples, aspects, and features described and illustrated so as not to obscure the disclosure with details that will be readily apparent to those of ordinary skill in the art having the benefit of the description herein.

DETAILED DESCRIPTION

Traditional stampede detection methods are designed using data associated with crowded environments, such as festivals and sporting events, and typically rely on crowd motion analysis (e.g., optical flow methods) to detect occurrence of stampedes. However, stampedes or other crowd panic may occur in less crowded environments. For example, a scene where four people are running may not be a stampede in an initially crowded environment, but may be a stampede in a less crowded environment. In such instances, trajectory analysis of individual people in the recorded scene, rather than crowd motion analysis, is required for stampede detection. However, noise associated with human detection and human tracking results in unreliable, scene-specific trajectory-analysis. To compensate for noise and reliably track individuals, computer vision systems may require substantial additional CPU and GPU resources to provide accurate and timely detection algorithms.

Thus, there is a need for computationally inexpensive stampede detection that takes into account crowd statistics for the scene. One example provides an imaging system including an image sensor and an electronic processor in communication with the image sensor. The electronic processor is configured to: obtain video data, captured using the image sensor, of a scene including a region of interest, the video data including a plurality of frames; determine a total number of detected humans in the region of interest of a current frame of the plurality of frames; determine a velocity of each detected human in the region of interest the current frame; determine a number of running humans in the region of interest of the current frame by determining a number of detected humans in the region of interest of the current frame having a velocity greater than a velocity threshold; determine a probability associated with the number of running humans in the region of interest of the current frame and the total number of detected humans in the region of interest of the current frame based on accumulated statistics for the region of interest, the accumulated statistics including average numbers of running humans out of total numbers of detected humans; and in response to determining that the probability is less than a threshold probability, generate an alert indicating a stampede is detected in the region of interest.

In some aspects, the electronic processor is configured to determine the probability based on a lookup table built using collected statistical data and having entries for the average number of running humans <x> for respective ranges of total number of detected humans in the region of interest.

In some aspects, the electronic processor is further configured to determine the ranges of total number of detected humans based on an amount of accumulated statistics for the region of interest.

In some aspects, each range is an integer value of total number of detected humans in the region of interest.

In some aspects, the electronic processor is configured to determine the probability for the region of interest of the current frame using a formula for binomial distribution, the formula defined as:

$$P(x) = \frac{n!}{(n-x)!x!} p^x q^{n-x},$$

where P(x) is the probability, n is the total number of detected humans in the region of interest of the current frame, x is the total number of detected humans in the region of interest of the current frame having a velocity greater than the velocity threshold, p=<x>/n for a respective range of total number of detected humans to which n belongs calculated using the lookup table, and q=1−p.

In some aspects, the electronic processor is further configured to: determine the velocity threshold by determining an average walking velocity for the region of interest, and set the velocity threshold to a value greater than the average walking velocity for the region of interest.

In some aspects, the electronic processor is configured to determine the average walking velocity for the region of interest based on a peak in a distribution of the velocity of each detected human for the plurality of frames.

In some aspects, the electronic processor is configured to determine a velocity of each detected human in the region of interest of the current frame by, for an anchor pixel associated with the detected human in the region of interest of the current frame: determining image coordinates of the anchor pixel in the region of interest of the current frame, determining a location of the detected human on a ground plane in physical world coordinates using camera parameters, determining the velocity of the detected human based on the location of the detected human in physical world coordinates in the current frame and a previous location of the detected human in physical world coordinates in a previous frame of the plurality of frames.

In some aspects, determine, for the anchor pixel, a human location error in the location of the detected human in physical world coordinates caused by an error in the image coordinates of the anchor pixel; determine whether the human location error is greater than a threshold error, and in response to determining that the human location error is greater than the threshold error, flag a location of the anchor pixel as being excluded from velocity determination.

In some aspects, the electronic processor is configured to determine the human location error by determining partial derivatives of the physical world coordinates with respect to the image coordinates.

In some aspects, the anchor pixel is at least one selected from a group consisting of a pixel representing a top of a bounding box, a pixel representing a bottom of a bounding box, a pixel representing a top of a human head in a bounding box, a pixel representing a top of human instance segmentation, a pixel representing a bottom of human instance segmentation, a pixel representing a head of human skeleton keypoints, and a pixel representing feet of human skeleton keypoints.

Another example provides a method for detecting a stampede. The method includes obtaining video data, captured using an image sensor, of a scene including a region of interest, the video data including a plurality of frames; determining a total number of detected humans in the region of interest of a current frame of the plurality of frames; determining a velocity of each detected human in the region of interest the current frame; determining a number of running humans in the region of interest of the current frame by determining a number of detected humans in the region of interest of the current frame having a velocity greater than a velocity threshold; determining a probability associated with the number of running humans in the region of interest of the current frame and the total number of detected humans in the region of interest of the current frame based on accumulated statistics for the region of interest, the accumulated statistics including average numbers of running humans out of total numbers of detected humans; and, in response to determining that the probability is less than a threshold probability, generating an alert indicating a stampede is detected in the region of interest.

In some aspects, determining the probability is based on a lookup table built using collected statistical data and having entries for the average number of running humans <x> for respective ranges of total number of detected humans in the region of interest.

In some aspects, the method further includes determining the ranges of total number of detected humans based on an amount of accumulated statistics for the region of interest.

In some aspects, each range is an integer value of total number of detected humans in the region of interest.

In some aspects, determining the probability for the region of interest of the current frame includes using a formula for binomial distribution, the formula defined as:

$$P(x) = \frac{n!}{(n-x)!x!} p^x q^{n-x},$$

where P(x) is the probability, n is the total number of detected humans in the region of interest of the current frame, x is the total number of detected humans in the region of interest of the current frame having a velocity greater than the velocity threshold, p=<x>/n for a respective range of total number of detected humans to which n belongs calculated using the lookup table, and q=1−p.

In some aspects, the method further includes determining the velocity threshold by determining an average walking velocity for the region of interest; and setting the velocity threshold to a value greater than the average walking velocity for the region of interest.

In some aspects, determining the average walking velocity for the region of interest is based on a peak in a distribution of the velocity of each detected human for the plurality of frames.

In some aspects, determining a velocity of each detected human in the region of interest of the current frame includes, for an anchor pixel associated with the detected human in the region of interest of the current frame: determining image coordinates of the anchor pixel in the region of interest of the current frame, determining a location of the detected human on a ground plane in physical world coordinates using camera parameters, determining the velocity of the detected human based on the location of the detected human in physical world coordinates in the current frame and a previous location of the detected human in physical world coordinates in a previous frame of the plurality of frames.

In some aspects, the method further includes determining, for the anchor pixel, a human location error in the location of the detected human in physical world coordinates caused by an error in the image coordinates of the anchor pixel; determining whether the human location error is greater than a threshold error, and, in response to determining that the human location error is greater than the threshold error, flagging a location of the anchor pixel as being excluded from velocity determination.

For ease of description, some or all of the example systems presented herein are illustrated with a single exemplar of each of its component parts. Some examples may not describe or illustrate all components of the systems. Other examples may include more or fewer of each of the illustrated components, may combine some components, or may include additional or alternative components.

FIG. 1 illustrates a video security system 20, according to some examples. The system 20 at least includes an imaging device, or camera 24, described in greater detail below with respect to FIG. 2. The camera 24 is, for example, a video camera arranged to record a scene. The camera 24 may be connectable over a network 28 to one or more devices, such as, for example, a user device 32. The network 28 may include a wide area network, such as the Internet, a local area network, or the like, employing any of a variety of communications protocols, such as Wi-Fi, Bluetooth®, ZigBee, and the like. Alternatively, or in addition, the camera 24 and/or the user device 32 may connect to the network 28 via a wired connection (e.g., using a cable, such as an Ethernet cable).

The user device 32 may be any suitable device for receiving a communication from the camera 24. For example, the user device 32 may be a mobile computing device (e.g., a cell phone, a smart phone, a tablet computer, a laptop computer, a personal digital assistant (PDA), etc.), a desktop computing device, a server computing device, or other networked computing device.

Figure 2:
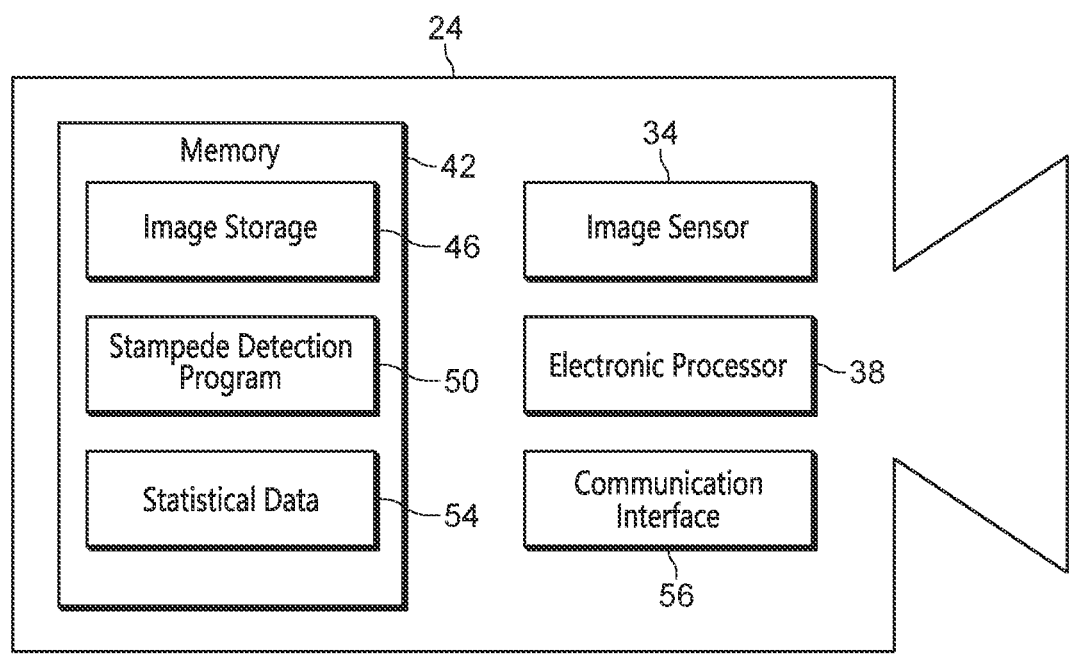
FIG. 2 illustrates an imaging device, according to some aspects.

FIG. 2 schematically illustrates the camera 24, according to some examples. The camera 24 includes an image sensor 34 for capturing video data. The camera 24 may be a digital imaging device or an analog imaging device. The image sensor 34 may be configured to capture light within the visible light frequency range and/or outside of the visible light frequency range (e.g., infrared or ultraviolet light). In some instances, the image sensor 34 includes multiple image sensors 34 configured to capture light in different frequency ranges. In some instances, the camera 24 is a stereo camera including at least two image sensors 34.

The camera 24 also includes an electronic processor 38 (for example, a microprocessor or other electronic device). The electronic processor 38 is electrically or communicatively coupled to the image sensor 34, a memory 42, and a communication interface 56. The electronic processor 38 includes suitable processing circuitry for performing the methods described herein or any combination of suitable processing circuitry. For example, the electronic processor 38 may include a digital signal processor (DSP), a graphics processing unit (GPU) embedded processor, a vision processing unit, etc. One or more circuit units included in the electronic processor 38 may operate independently or in parallel with one another.

In the example shown, the memory 42 stores data and computer program instructions for performing, among other things, the methods described herein. For example, the memory 42 includes image storage 46 for storing images captured by the image sensor 34, a stampede detection program 50 executable by the electronic processor 38 for identifying stampedes or other panic behavior in a scene recorded by the camera 24, and statistical data 54 used by the electronic processor 38 in conjunction with the stampede detection program 50 for detecting stampedes.

As used herein, the term "stampede" refers to an anomalous number of individuals running in a scene, relative to what is considered a statistically "normal" number of running individuals for that scene. The scene may represent the entire field of view of the camera 24 and the stampede detection described herein may be performed for a region of interest of the scene, which may be the entire scene or one or more portions thereof. For example, the region of interest may represent only a portion of a field of view of the camera, such as, for example, an area within a park, a parking lot, a sidewalk, an area defined by property lines, or the like. The region of interest may be defined, within the field of view, by a user. For example, through the stampede detection program 50 and one or more user interfaces associated with the same, a user may define one or more portions of the field of view of the camera 24 as the region of interest by specifying coordinates, drawing or applying lines and/or geometric shapes, or the like. Alternatively, the region of interest may be defined automatically by identifying (e.g., through one or more image segmentation techniques) objects or areas in the field of view where humans may routinely be present (e.g., grass, roads, sidewalks, or the like). Machine learning techniques may also be used to learn such areas from training data, such as, for example, manually marked scenes. However defined, the region of interest represents one or more portions within the field of view, wherein humans are detected for stampede detection. However, more than just the region of interest may be analyzed as part of performing stampede detection as described herein. For example, in some embodiments, the entire field of view may be analyzed to detect humans because, when a human is detected within the region of interest, the detected human's prior positions, which may be outside of the region of interest, are needed to determine the detected human's velocity.

The term "running" may refer to any individual moving faster than an average walking speed, which may be determined statistically for the scene as described below. In some instances, "running" may include speed-walking, jogging, sprinting, rollerblading, skateboarding, or the like. However, in some instances, the term "running" does not refer to some or all types of assisted movement, such as rollerblading, skateboarding, cycling, or the like. For example, in some embodiments, the stampede detection program 50 or a separate program may be configured to exclude a detected human moving with a movement assistance device from the stampede detection methods described herein, such as, for example, by detecting (e.g., using image analysis) a human using a movement assistance device (e.g., a human riding a bike or a scooter), applying a velocity threshold to exclude a detected human traveling at speeds associated with movement assistance devices, or a combination thereof. As described in further detail below, a "running" speed threshold may be established for a particular scene based on historical velocities and different human behavior in different environments and locations. For example, a scene of an airport may be associated with a higher "running" speed threshold than a scene of a park.

The statistical data 54 may be accumulated by the electronic processor 38 for a particular scene (e.g., the region of interest) over at least a predefined minimum learning period. The minimum learning period may be, for example, 12 hours, 24 hours, one week, one month, or the like. However, the electronic processor 38 may continue to accumulate statistical data 54 beyond the minimum learning period. As described below, the statistical data 54 may be used to determine average walking speeds for the scene, statistically normal numbers of running people for various crowd sizes, or a combination thereof.

The memory 42 may include read only memory (ROM), random access memory (RAM), other non-transitory computer-readable media, or a combination thereof. The camera 24 (e.g., the electronic processor 38) is configured to send and receive data, such as video data, video analytics data, alerts, and/or commands to one or more external devices (e.g., the user device 32) using the communication interface 56. In some instances, the stampede detection program 50 and/or the statistical data 54 are stored external to the camera 24, and the camera 24 transmits video data to an external device for stampede detection. Accordingly, although methods relating to the stampede detection program 50 are described herein with respect to the components of the camera 24, it should be understood that such methods may be performed using components external to the camera 24. The camera 24 may include additional components other than those described with respect to FIG. 2.

Figure 3:
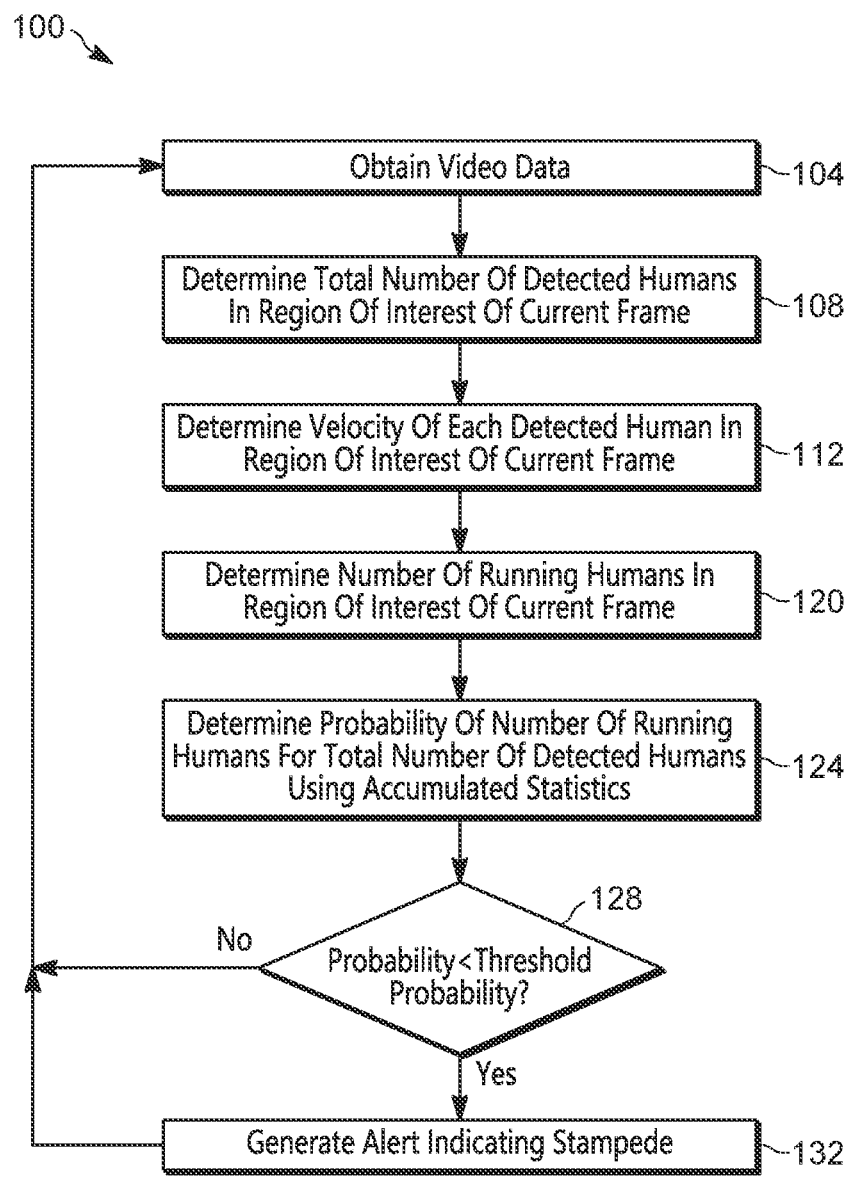
FIG. 3 illustrates a method for detecting a stampede, according to some aspects.

FIG. 3 illustrates a method 100 performed, for example, by the electronic processor 38, for detecting a stampede. The method 100 includes obtaining video data (e.g., a plurality of image frames), captured using the image sensor 34, of a scene including a region of interest (at block 104). The video data includes a plurality of frames, and the electronic processor 38 determines, for the region of interest of a current frame, a total number of detected humans (at block 108). The electronic processor 38, as part of determining the total number of detected humans, may also initially detect humans in the region of interest of the current frame using, for example, known computer vision and object detection techniques. However, in other embodiments, this detection may be done by a separate component and may be obtained by the electronic processor 38 with the image data.

The electronic processor 38 also determines a velocity of each detected human in the region of interest of the current frame (at block 112). The electronic processor 38 may determine a velocity of each detected human by determining a location of the detected human on a plane (e.g., a ground plane) in physical world coordinates using camera parameters and an anchor pixel representing the detected human in the current frame and tracking how this location changed over time (e.g., determining the location in physical world coordinates for the anchor pixel in the region of interest of the current frame and in one or more previous frames associated with the same detected human). Determining this location in physical world coordinates (also referred to as projecting image coordinates from an image frame to physical world coordinates) uses parameters of the camera 24 (as calibrated for the scene), which may include, but are not limited to, camera focal length, camera height, camera tilt, camera roll, or a combination thereof.

The anchor pixel may be determined based on a bounding box of a detected human, an instance segmentation of a detected human, skeleton keypoints detection (e.g., a human head keypoint and/or a human feet keypoint(s)), or other computer vision methods. In some embodiments, the electronic processor 38 projects a single anchor pixel for a detected human and determines the velocity of the detected human based on the single projected pixel. In other embodiments, the electronic processor 38 projects multiple anchor pixels for a detected human and determines the velocity of the detected human based on one or more of the anchor pixels.

Figure 4:
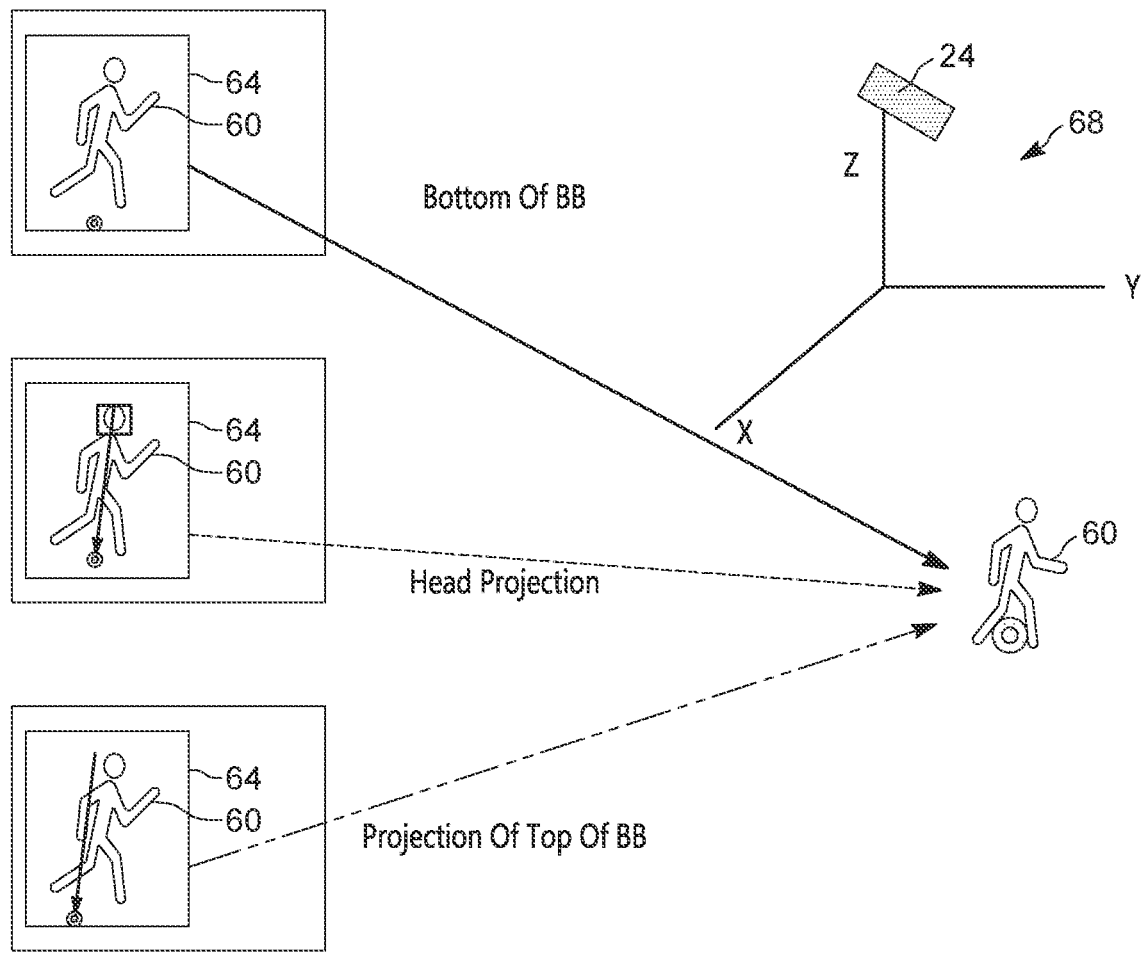
FIG. 4 illustrates example projections of a detected human in a frame to physical world coordinates, according to some aspects.

For example, as illustrated in FIG. 4, the electronic processor 38 may determine the velocity of a detected human (e.g., detected human 60) in the region of interest using an anchor pixel defined based on a bounding box (e.g., bounding box 64) bounding the detected human 60 or a portion thereof. The bounding box may be determined by the electronic processor 38 as part of the method 100, such as, for example, as part of detecting humans in the current frame. As illustrated in FIG. 4, the anchor pixel may be a pixel representing a bottom of a bounding box, a top of a bounding box, or a top of a head of a detected human (e.g., a head of a detected human within a bounding box). Different types of the anchor pixels may require different methods of determining a location in physical world coordinates. For example, an anchor pixel representing the bottom of the detected human's feet may use a projection method that projects the pixel to the ground plane. The electronic processor 38, as part of determining an anchor pixel representing a top of a head of a detected human, may also initially detect a head of the human using, for example, known computer vision and object detection techniques. However, in other embodiments, this detection may be done by a separate component and may be obtained by the electronic processor 38 with the image data.

Figure 5:
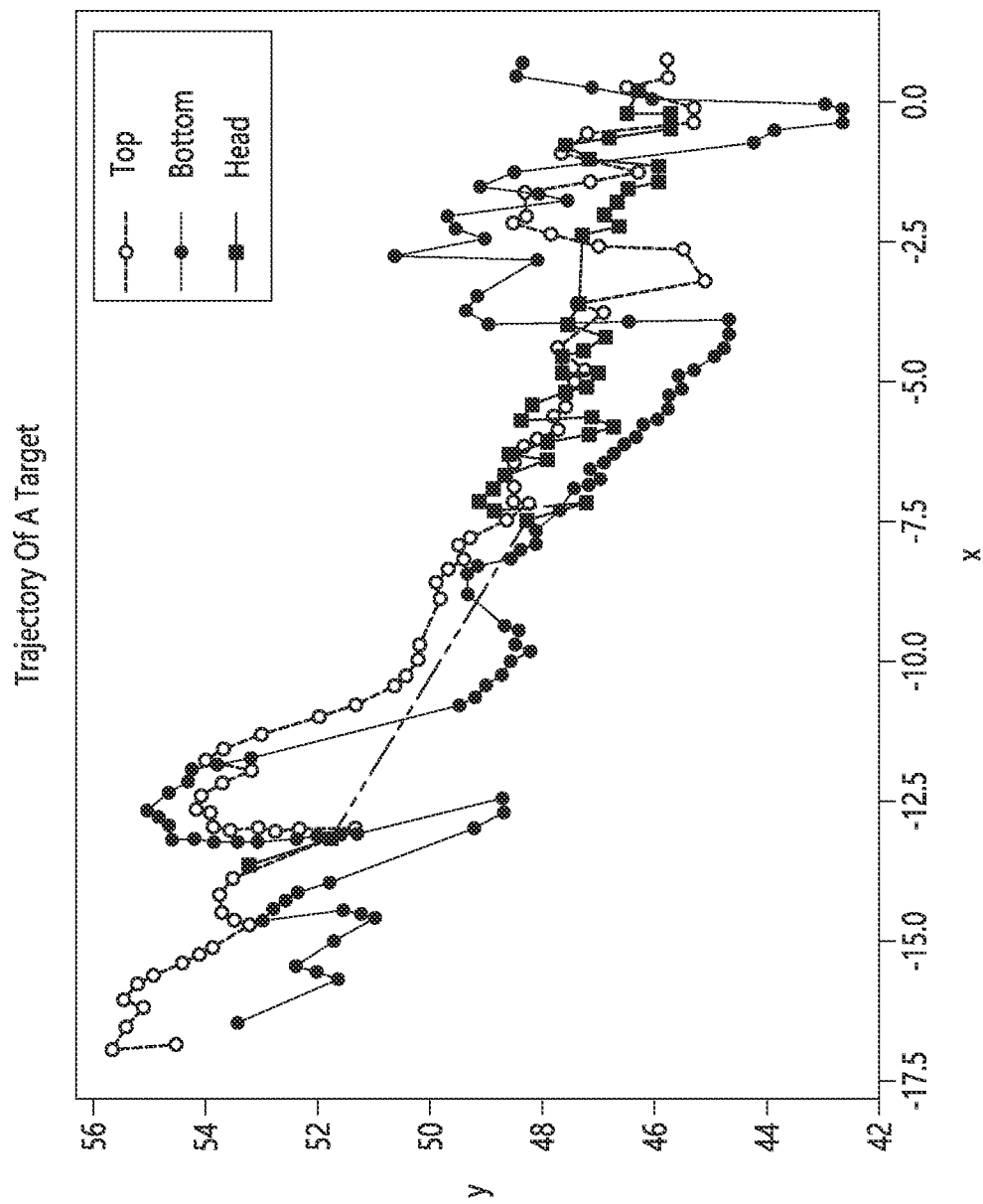
FIG. 5 illustrates a graph plotting trajectory of a detected human based on different methods of image projection, according to some aspects.

In some instances, velocity calculations include substantial noise. For example, FIG. 5 illustrates a trajectory map of a detected human where the location of the detected human is estimated by projecting a pixel representing the top of a human height bounding box, a pixel representing the bottom of a human height bounding box, and a pixel representing the top of a human head bounding box, respectively. As illustrated in FIG. 5, the determined location of the detected human, and, therefore, the resulting velocity calculation, varies according to the anchor pixel used. Therefore, in some instances, the electronic processor 38 determines a velocity of a detected human using multiple anchor pixels and smooths the determined velocity of a detected human by determining an average of, or a selecting a minimum of, a plurality of velocities determined using different anchor pixels and associated projection method. However, other methods of smoothing velocities are contemplated.

In some instances, the electronic processor 38 removes, or filters, outliers in velocity determinations to further reduce the noise in the velocity determinations. Noise in a bounding box may translate to significant noise (e.g., up to several feet) for human coordinates in the physical world and the magnitude of this noise depends on the location of the anchor pixel (or the bounding box associated with the anchor pixel). For example, a small error in an anchor pixel location in image coordinates may translate to too large an error in physical coordinates for a detected human and the velocity determined for such a detected human should be ignored when determining a number of running humans detected in a region of interest of a current frame.

In some embodiments, the electronic processor 38 flags pixels (e.g., anchor pixels) with significant human location errors (i.e., an error exceeding a threshold) as part of determining a velocity for a detected human. When such a pixel is flagged, the image coordinates of the pixel may not be used to determine a velocity of a detected human. In some embodiments, when such a pixel is flagged, a region may be flagged and excluded from velocity determinations for a given type of anchor pixel. In other words, in some embodiments, in response to an anchor pixel for a detected human being associated with a significant error, no velocity is determined for the detected human and, thus, the detected human is not used during the stampede detection method 100. Also, in some embodiments, a human location error may be determined for each pixel in the region of interest (e.g., using a potential or hypothetical bounding box, wherein the pixel may represent a top or bottom pixel of the bounding box), which can be used to create an image mask such that humans detected in masked areas of the image are excluded from velocity estimation (i.e., no velocity is determined for the detected human and, thus, the detected human cannot be included in a count of "running" humans for the region of interest).

Figure 6:
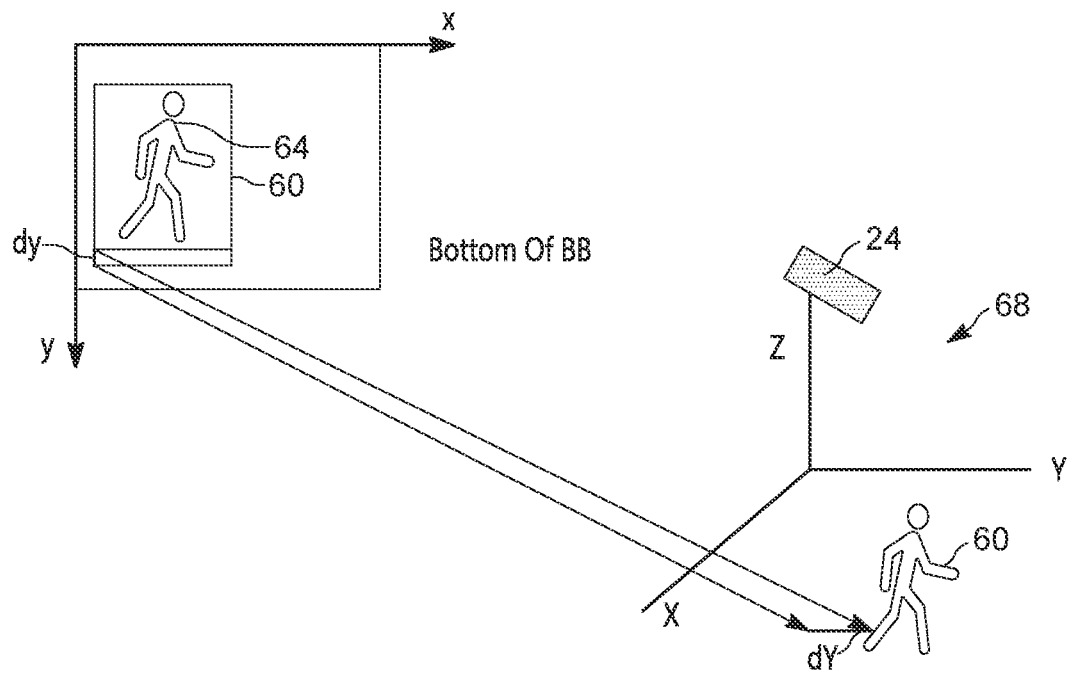
FIG. 6 illustrates an example magnification of pixel noise for an image projection, according to some aspects.

FIG. 6 illustrates an example of human location error in the human location on the ground plane of the physical world due to bounding box noise, where the anchor pixel corresponds to the bottom of the bounding box 64. The electronic processor 38 determines a human location error associated with the anchor pixel by determining partial derivatives of the physical world coordinates of the anchor pixel with respect to the image coordinates of the anchor pixel (e.g., $dY/dy$, $dX/dx$, or both). For example, for a given change in the image coordinates of the anchor pixel (e.g., a change in the image coordinates by one pixel), the electronic processor 38 determines the resulting change in the physical world coordinates. In some instances, areas in a region of interest that are closer to a horizon line may have larger partial derivatives than areas in the region of interest closer to the camera 24.

The electronic processor 38 may determine whether the human location error (e.g., the change in physical world coordinates relative to a change in image coordinates for the anchor pixel) is greater than a threshold error. The threshold error may be, for example, 10 centimeters ("cm"), 50 cm, 1 meter ("m"), or another threshold value. In some instances, the threshold error is a user selected threshold value. In response to determining that the human location error is greater than the threshold error, the electronic processor 38 flags the anchor pixel as being excluded from velocity determination. An exclusion of the anchor pixel from velocity determination may include an exclusion of the detected human to which the anchor pixel corresponds. Because regions of the frame having significant magnification of pixel noise may result in unreliable velocity measurements, the electronic processor 38 excludes these regions from being used in velocity measurements of detected humans.

In addition to filtering out pixels that result in significant magnification of pixel noise, the electronic processor 38 may perform one or more plausibility checks on a determined velocity. For example, the electronic processor 38 may filter out velocities corresponding to chaotic trajectories (e.g., quick changes in direction of movement), straight line trajectories (e.g., straight line trajectories that be associated with a movement assistance device such as a bicycle or skateboard), velocities exceeding a plausibility threshold velocity (e.g., a velocity at which it is unlikely a human can achieve), and/or other movement characteristics. In some examples, the plausibility threshold velocity corresponds to a velocity associated with a movement assistance device. The movement characteristics of detected humans that are filtered from the velocity determinations may be pre-set or user-defined.

Figure 7:
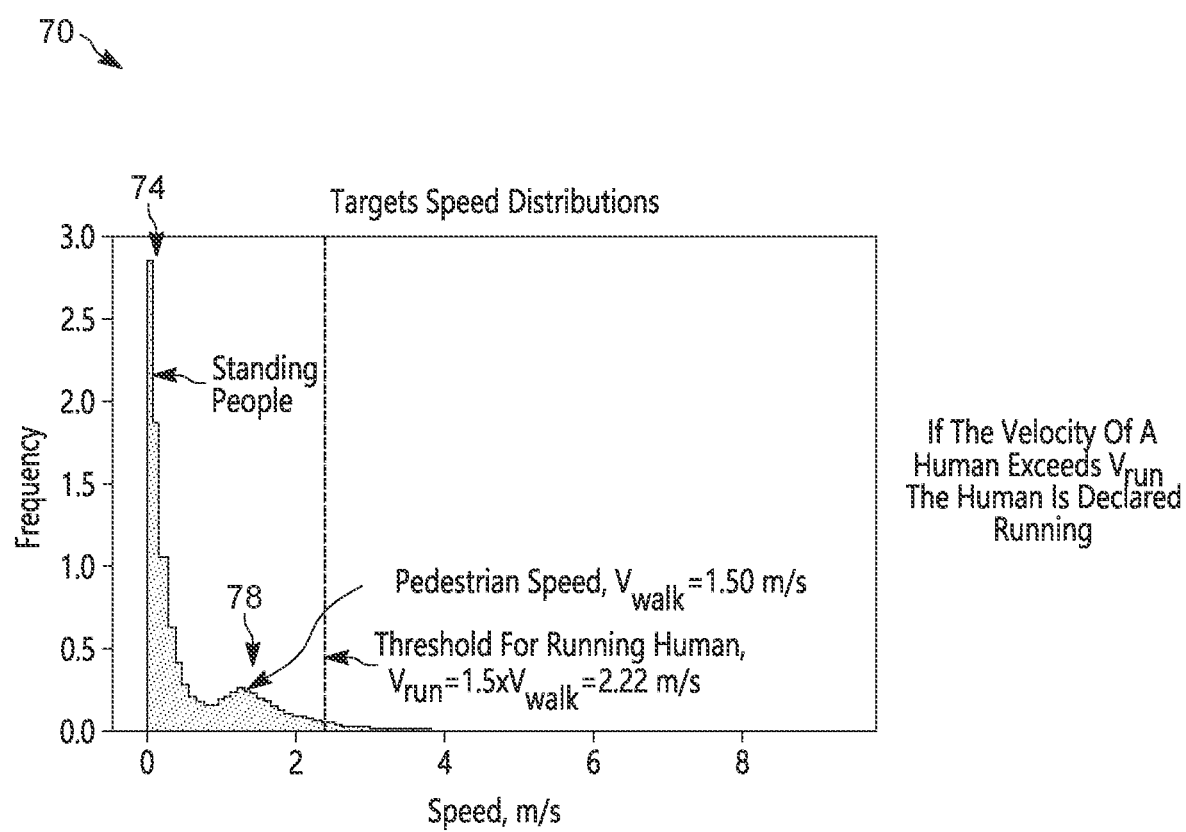
FIG. 7 illustrates an example human speed distribution for a scene, according to some aspects.

Referring again to FIG. 3, the electronic processor 38 determines a number of running humans in the region of interest of the current frame (at block 120). The electronic processor 38 determines the number of running humans in the region of interest of the current frame by determining a number of the detected humans in the region of interest of the current frame having a velocity greater than a velocity threshold. The electronic processor 38 determines the velocity threshold based on accumulated statistics (e.g., the statistical data 54) of velocity determinations for the region of interest. For example, FIG. 7 illustrates an example human speed distribution 70 for a region of interest. The example speed distribution includes two peaks 74 and 78 in frequency of detected human speed. The first peak 74 occurs at approximately 0 meters per second ("m/s") and represents a frequency of detected humans that are standing. The second peak 78 occurs at approximately 1.5 m/s and represents an average pedestrian speed, or average walking speed, of detected humans in the region of interest.

Accordingly, the electronic processor 38 determines the average walking speed for the region of interest according to the second peak 78 in the speed distribution and determines the velocity threshold using the average walking speed. For example, the electronic processor 38 may determine that the velocity threshold is 1.5 times the average walking speed. In the example illustrated in FIG. 8, the electronic processor 38 set the velocity threshold to 2.22 m/s. However, the electronic processor 38 may determine the velocity threshold by multiplying the average walking speed with a value different that 1.5 (e.g., 1.75, 2, or another constant multiplier), and, in some embodiments, the electronic processor 38 sets the velocity threshold to any value greater than the average walking speed for the region of interest. Additionally, while described herein as a velocity, the velocity threshold may be speed-based without taking direction into account.

The value of the average walking speed may vary depending on the region of interest. For example, people may walk faster in airports than in shopping malls. Additionally, the value of average walking speed may also vary due to errors in camera calibration. Therefore, by determining the velocity threshold based on a region of interest-specific distribution of velocities, the electronic processor 38 may produce more accurate determinations of anomalous movement as compared to relying on a preset velocity threshold.

Referring again to FIG. 3, the method 100 also includes determining, with the electronic processor 38, a probability associated with the number of running humans in the region of interest of the current frame for the total number of detected humans in the region of interest of the current frame using accumulated statistics for the region of interest (at block 124). The electronic processor 38 determines the probability based on a first lookup table built using collected statistical data and having entries for the average number of running humans <x> for respective ranges of total number of detected humans in the region of interest. For example, the electronic processor 38 may determine, using the first lookup table, that for a region of interest having a range between ten and twenty people, the average number of running humans <x> for that range may be 0.1, 1, 3, or another number based on the statistical data relating to that region of interest.

The electronic processor 38 determines the ranges of total number of detected humans based on the amount of accumulated statistics for the region of interest (e.g., included in the statistical data 54). For example, in instances where the electronic processor 38 has accumulated a large amount of statistical data for the region of interest, each range may be an integer number of total number of detected humans in the region of interest. Table 1 is an example first lookup table containing the average number of running humans <x> for a corresponding range of total number of detected humans n. Additionally, the first lookup table may take into account noise related to determinations that a human is running (e.g., noise from bounding boxes resulting in false detections).

TABLE 1

| Total Number of Detected Humans, n | Average Number of Running Humans, <x> |
|---|---|
| 1 | 0.001 |
| 2 | 0.002 |
| ... | ... |
| 100 | 2.344 |
| ... | ... |

As described above, while Table 1 represents ranges comprising an integer number of total number of detected humans n, the electronic processor 38 may combine data from adjacent rows of the first lookup table in order to increase the amount of data available for each range and improve statistical accuracy. For example, the electronic processor 38 may combine data from adjacent rows during an initial learning period when only a small amount of statistical data has been accumulated.

For each respective range of total number of detected humans n, the electronic processor 38 further determines an average probability p of a human to be running in a region of interest having the respective range of total number of detected humans. The electronic processor 38 may store the average probabilities in a second lookup table, such as the example second lookup table of Table 2.

TABLE 2

| Total Number of Detected Humans, n | Probability of a Human to Be Running, p = <x>/n |
|---|---|
| 1 | 0.001 |
| 2 | 0.001 |
| ... | ... |
| 100 | 0.2344 |
| ... | ... |

The electronic processor 38 assumes that, for each range of total number of detected humans, whether detected humans are running are binary independent and identically distributed ("iid") variables, and therefore that the detected humans in the region of interest run independently of one another. The electronic processor 38 determines the probability P(x) of the number of running humans detected in the region of interest of the current frame using a formula for binomial distribution:

$$P(x) = \frac{n!}{(n-x)!x!} p^x q^{n-x},$$

where P(x) is the probability, n is the total number of detected humans in the region of interest of the current frame (e.g., determined at block 108), x is the total number of detected humans in the region of interest of the current frame having a velocity greater than the velocity threshold (e.g., determined at block 120), p is a probability for any human to be running calculated as p=<x>/n for a respective range of total number of detected humans to which n belongs calculated using the first lookup table and stored in the second lookup table, and q=1−p. As an example with reference to the statistical data of Table 1 and Table 2, for a frame having 100 people, 40 of whom are running, the probability of the forty people running in the region of interest is $$P(40) = \frac{100!}{(100-40)!40!} 0.2344^{40} 0.7656^{100-40},$$

which reduces to a probability P(40)=9.4755*10$^{-5}$, or approximately 0.0095%.

Figure 8:
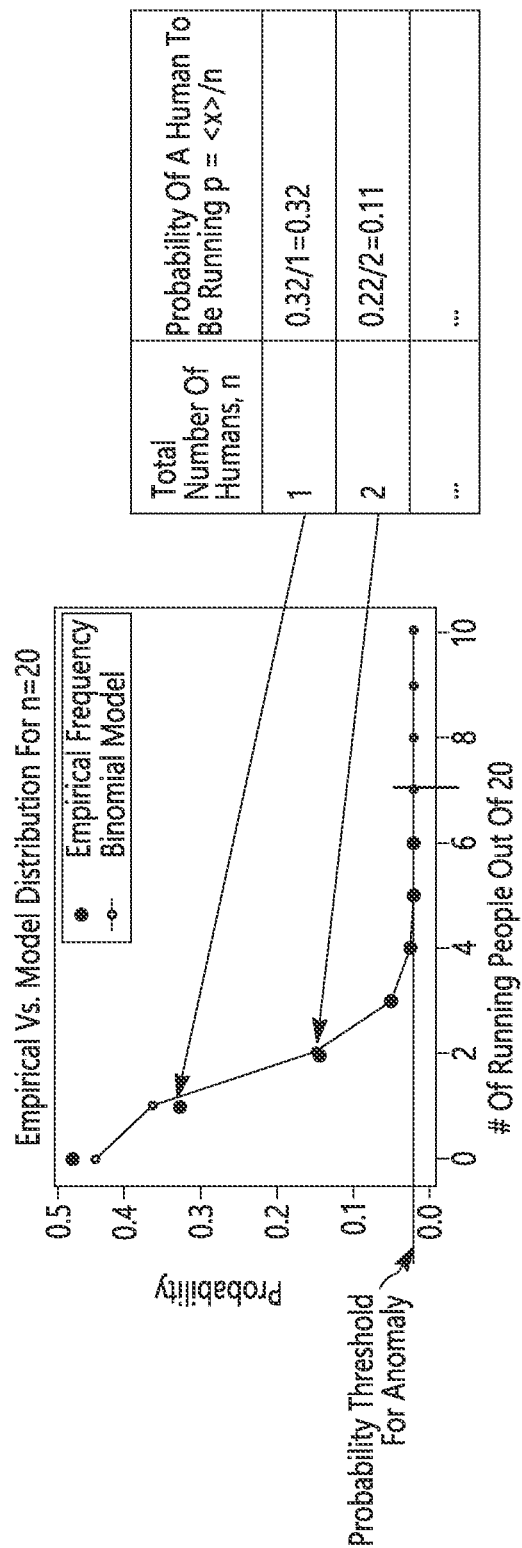
FIG. 8 illustrates an example probability distribution for a scene, according to some aspects.

The electronic processor 38 determines whether the probability P(x) is less than a threshold probability indicating that a stampede is detected in the region of interest (at block 128). The threshold probability may be a pre-set probability threshold stored in the memory 42, or a user-defined probability threshold provided to the electronic processor 38 using the communication interface 56 and stored in the memory 42. For example, FIG. 8 illustrates an example probability distribution (e.g., an experimental probability distribution) for a region of interest having 20 people where the electronic processor 38 determines that a stampede is detected when at least seven of the twenty people are running.

Referring again to FIG. 3, in response to determining that the probability P(x) is less than the threshold probability (YES at block 132), the electronic processor 38 generates an alert indicating a stampede is detected in the region of interest. The electronic processor 38 provides the alert to, for example, the user device 32 over the network 28 and continues performing the stampede detection method 100 by, for example, repeating the steps of the method 100. When a stampede is not detected (NO at block 132), the electronic processor 38 continues the stampede detection method 100 by, for example, repeating the steps of the method 100.

In the foregoing specification, specific examples have been described. However, one of ordinary skill in the art appreciates that various modifications and changes can be made without departing from the scope of the claimed subject matter. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

Additionally, unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations, for example, collectively. To reiterate, those electronic processors and processing may be distributed.

What is claimed is:

1. An imaging system comprising:
   an image sensor; and
   an electronic processor in communication with the image sensor, the electronic processor configured to:
      obtain video data, captured using the image sensor, of a scene including a region of interest, the video data including a plurality of frames;
      determine a total number of detected humans in the region of interest of a current frame of the plurality of frames;
      determine a velocity of each detected human in the region of interest the current frame;
      determine a number of running humans in the region of interest of the current frame by determining a number of detected humans in the region of interest of the current frame having a velocity greater than a velocity threshold;
      determine a probability associated with the number of running humans in the region of interest of the current frame and the total number of detected humans in the region of interest of the current frame based on accumulated statistics for the region of interest, the accumulated statistics including average numbers of running humans out of total numbers of detected humans; and
      in response to determining that the probability is less than a threshold probability, generate an alert indicating a stampede is detected in the region of interest.

2. The imaging system of claim 1, wherein the electronic processor is configured to determine the probability based on a lookup table built using collected statistical data and having entries for the average number of running humans <x> for respective ranges of total number of detected humans in the region of interest.

3. The imaging system of claim 2, wherein the electronic processor is further configured to determine the ranges of total number of detected humans based on an amount of accumulated statistics for the region of interest.

4. The imaging system of claim 2, wherein each range is an integer value of total number of detected humans in the region of interest.

5. The imaging system of claim 2, wherein the electronic processor is configured to determine the probability for the region of interest of the current frame using a formula for binomial distribution, the formula defined as:

$$P(x) = \frac{n!}{(n-x)!x!} p^x q^{n-x},$$

where P(x) is the probability, n is the total number of detected humans in the region of interest of the current frame, x is the total number of detected humans in the region of interest of the current frame having a velocity greater than the velocity threshold, p=<x>/n for a respective range of total number of detected humans to which n belongs calculated using the lookup table, and q=1−p.

6. The imaging system of claim 1, wherein the electronic processor is further configured to:
   determine the velocity threshold by determining an average walking velocity for the region of interest, and
   set the velocity threshold to a value greater than the average walking velocity for the region of interest.

7. The imaging system of claim 6, wherein the electronic processor is configured to determine the average walking velocity for the region of interest based on a peak in a distribution of the velocity of each detected human for the plurality of frames.

8. The imaging system of claim 1, wherein the electronic processor is configured to determine a velocity of each detected human in the region of interest of the current frame by:
   for an anchor pixel associated with the detected human in the region of interest of the current frame:
      determining image coordinates of the anchor pixel in the region of interest of the current frame,
      determining a location of the detected human on a ground plane in physical world coordinates using camera parameters, and determining the velocity of the detected human based on the location of the detected human in physical world coordinates in the current frame and a previous location of the detected human in physical world coordinates in a previous frame of the plurality of frames.

9. The imaging system of claim 8, wherein the electronic processor is further configured to:
determine, for the anchor pixel, a human location error in the location of the detected human in physical world coordinates caused by an error in the image coordinates of the anchor pixel;
determine whether the human location error is greater than a threshold error, and
in response to determining that the human location error is greater than the threshold error, flag a location of the anchor pixel as being excluded from velocity determination.

10. The imaging system of claim 9, wherein the electronic processor is configured to determine the human location error by determining partial derivatives of the physical world coordinates with respect to the image coordinates.

11. The imaging system of claim 8, wherein the anchor pixel is at least one selected from a group consisting of a pixel representing a top of a bounding box, a pixel representing a bottom of a bounding box, a pixel representing a top of a human head in a bounding box, a pixel representing a top of human instance segmentation, a pixel representing a bottom of human instance segmentation, a pixel representing a head of human skeleton keypoints, and a pixel representing feet of human skeleton keypoints.

12. A method for detecting a stampede, the method comprising:
obtaining video data, captured using an image sensor, of a scene including a region of interest, the video data including a plurality of frames;
determining a total number of detected humans in the region of interest of a current frame of the plurality of frames;
determining a velocity of each detected human in the region of interest the current frame;
determining a number of running humans in the region of interest of the current frame by determining a number of detected humans in the region of interest of the current frame having a velocity greater than a velocity threshold;
determining a probability associated with the number of running humans in the region of interest of the current frame and the total number of detected humans in the region of interest of the current frame based on accumulated statistics for the region of interest, the accumulated statistics including average numbers of running humans out of total numbers of detected humans; and
in response to determining that the probability is less than a threshold probability, generating an alert indicating a stampede is detected in the region of interest.

13. The method of claim 12, wherein determining the probability is based on a lookup table built using collected statistical data and having entries for the average number of running humans <x> for respective ranges of total number of detected humans in the region of interest.

14. The method of claim 13, further comprising:
determining the ranges of total number of detected humans based on an amount of accumulated statistics for the region of interest.

15. The method of claim 13, wherein each range is an integer value of total number of detected humans in the region of interest.

16. The method of claim 13, wherein determining the probability for the region of interest of the current frame includes using a formula for binomial distribution, the formula defined as:
$P(x)=n!/(n-x)!x!p^x q^{n-x}$, where $P(x)$ is the probability, n is the total number of detected humans in the region of interest of the current frame, x is the total number of detected humans in the region of interest of the current frame having a velocity greater than the velocity threshold, $p=<x>/n$ for a respective range of total number of detected humans to which n belongs calculated using the lookup table, and $q=1-p$.

17. The method of claim 12, further comprising:
determining the velocity threshold by determining an average walking velocity for the region of interest; and
setting the velocity threshold to a value greater than the average walking velocity for the region of interest.

18. The method of claim 17, wherein determining the average walking velocity for the region of interest is based on a peak in a distribution of the velocity of each detected human for the plurality of frames.

19. The method of claim 12, wherein determining a velocity of each detected human in the region of interest of the current frame includes:
for an anchor pixel associated with the detected human in the region of interest of the current frame:
determining image coordinates of the anchor pixel in the region of interest of the current frame,
determining a location of the detected human on a ground plane in physical world coordinates using camera parameters, and
determining the velocity of the detected human based on the location of the detected human in physical world coordinates in the current frame and a previous location of the detected human in physical world coordinates in a previous frame of the plurality of frames.

20. The method of claim 19, further comprising:
determining, for the anchor pixel, a human location error in the location of the detected human in physical world coordinates caused by an error in the image coordinates of the anchor pixel;
determining whether the human location error is greater than a threshold error, and
in response to determining that the human location error is greater than the threshold error, flagging a location of the anchor pixel as being excluded from velocity determination.

* * * * *